United States Patent
Pedersen et al.

(10) Patent No.: US 10,717,074 B2
(45) Date of Patent: Jul. 21, 2020

(54) METHOD FOR PREPARATION OF A MONOLITHIC CATALYST FOR THE REDUCTION OF NITROGEN OXIDES, VOC AND CARBON MONOXIDE IN AN OFF-GAS

(71) Applicant: Haldor Topsøe A/S, Kgs. Lyngby (DK)

(72) Inventors: Kim Hougaard Pedersen, Virum (DK); Viggo Lucassen Hansen, Brønshøj (DK); Francesco Castellino, Birkerød (DK)

(73) Assignee: Haldor Topsoe A/S, Lyngby (DK)

( * ) Notice: Subject to any disclaimer, the term of this patent is extended or adjusted under 35 U.S.C. 154(b) by 98 days.

(21) Appl. No.: 16/096,380

(22) PCT Filed: Jun. 19, 2017

(86) PCT No.: PCT/EP2017/064898
§ 371 (c)(1),
(2) Date: Oct. 25, 2018

(87) PCT Pub. No.: WO2017/220473
PCT Pub. Date: Dec. 28, 2017

(65) Prior Publication Data
US 2019/0143315 A1 May 16, 2019

(30) Foreign Application Priority Data

Jun. 21, 2016 (DK) .............................. 2016 00365

(51) Int. Cl.
| *B01J 37/02* | (2006.01) |
| *B01J 37/03* | (2006.01) |
| *B01J 21/06* | (2006.01) |
| *B01J 23/648* | (2006.01) |
| *B01J 23/652* | (2006.01) |
| *B01J 35/04* | (2006.01) |
| *B01D 53/86* | (2006.01) |
| *B01J 37/08* | (2006.01) |

(52) U.S. Cl.
CPC ........ *B01J 37/0248* (2013.01); *B01D 53/864* (2013.01); *B01D 53/8628* (2013.01); *B01J 21/063* (2013.01); *B01J 23/6482* (2013.01); *B01J 23/6527* (2013.01); *B01J 35/04* (2013.01); *B01J 37/0236* (2013.01); *B01J 37/035* (2013.01); *B01J 37/038* (2013.01); *B01J 37/08* (2013.01); *B01D 2255/1023* (2013.01); *B01D 2255/20723* (2013.01); *B01D 2255/20776* (2013.01)

(58) Field of Classification Search
CPC .. B01J 37/0248; B01J 21/063; B01J 23/6482; B01J 23/6527; B01J 35/04; B01J 37/0236; B01J 37/035; B01J 37/038; B01J 37/08; B01D 53/8628; B01D 53/864
See application file for complete search history.

(56) References Cited

U.S. PATENT DOCUMENTS

| 5,227,356 A | 7/1993 | Hess et al. |
| 2002/0028365 A1 | 3/2002 | Hirabayashi |
| 2004/0116285 A1 | 6/2004 | Huang et al. |
| 2010/0099552 A1 | 4/2010 | Fu et al. |
| 2011/0150742 A1 | 6/2011 | Han et al. |

FOREIGN PATENT DOCUMENTS

| EP | 2 179 792 A1 | 4/2010 | |
| JP | 07213903 A * | 8/1995 | .............. B01J 23/64 |
| WO | WO 90/13352 A1 | 11/1990 | |

* cited by examiner

*Primary Examiner* — Melvin C. Mayes
*Assistant Examiner* — Michael Forrest
(74) *Attorney, Agent, or Firm* — Blank Rome LLP

(57) ABSTRACT

Method for the preparation of a monolithic catalyst for the reduction of nitrogen oxides VOC and carbon monoxide in an off-gas, the catalyst comprises at least one platinum group metal, vanadium, titania and optionally tungsten oxide.

7 Claims, No Drawings

METHOD FOR PREPARATION OF A MONOLITHIC CATALYST FOR THE REDUCTION OF NITROGEN OXIDES, VOC AND CARBON MONOXIDE IN AN OFF-GAS

The present invention relates to manufacture of monolithic shaped catalyst for use in the removal or reduction of the content of nitrogen oxides, volatile organic compounds (VOC) and carbon monoxide from off-gas.

In particular, the invention provides a method for the preparation of catalyst comprising vanadium oxide, titania and platinum group metals (PGM) supported on and within walls of a monolithic substrate with reduced axial and radial gradients of palladium concentrations on the substrate.

PGM, in particular palladium promoted vanadium oxide catalysts offer a very high CO and VOC oxidation activity in combination with a moderate to high selective catalytic reduction (SCR) activity of nitrogen oxides and high sulphur resistance.

Monolithic shaped catalysts of the above type are typically prepared by coating the monolithic substrate with a washcoat containing a catalyst carrier material and impregnating the coated substrate with a solution of precursors of the catalytic active metal oxides. Alternatively, the washcoat can also contain the precursors.

Washcoating of a monolithic or honeycomb monolithic substrate is usually performed by slurry pickup in the substrate by pouring the slurry into the channels of the monolithic substrate, by dipping the substrate at one side into the washcoat slurry and optionally applying vacuum at the opposite side or by pumping the washcoat slurry into the channels.

After having been coated with the washcoat, the substrate is dried and finally calcined for activation of the catalytic components in the coat.

A problem with washcoating and/or impregnating the substrate is that it can affect concentration gradients of the catalytic components, both across the thickness of the washcoat layer and along the axis of channels in a monolith. As such, it has a potential impact on the quality and performance of the finished catalyst as mentioned above.

Concentration gradients are in particular disadvantageous in PGM promoted vanadium SCR catalysts. The catalytic activity in the SCR reaction and the CO and VOC oxidation is dependent on the PGM concentration on the catalytic active surface of the coated substrate.

Formation of gradients is in particular a problem in the impregnation of a substrate which is preloaded with vanadium oxide. That is due to strong and fast adsorption of PGM on vanadium oxide in the catalyst substrate that makes it necessary to impregnate the catalyst substrate with excess amounts of palladium/platinum in order to reach a minimum load in the center of the substrate. The production process can also be difficult to control, e.g. depletion of PGM precursors if wet impregnation is applied.

To efficiently utilize the costly PGM and to provide required oxidation activity in all parts of the substrate it is necessary to avoid formation of PGM concentration gradients over the whole axial and vertical length of the catalyzed substrate.

We have found that gradients can be eliminated or substantially diminished when decreasing the rate of adsorption of PGM on a catalyst substrate. Instead of having precursor compounds of PGM dissolved in an aqueous impregnation liquid, the precursor compounds are added to an aqueous slurry containing vanadium compounds precipitated on titania particles, which act as a carrier for PGM and which is used for the coating of the substrate. In this aqueous slurry the PGM compounds are adsorbed on the supported vanadium compound particles and are thereby not dissolved in the aqueous phase of the aqueous slurry, which otherwise would result in undesired gradients due to the strong and fast adsorption of dissolved PGM compounds on surface and possibly within the walls of the substrate.

Pursuant to the above findings and observations, this invention provides a method for the preparation of a monolithic catalyst for the reduction of nitrogen oxides, VOC and carbon monoxide in an off-gas, the catalyst comprises of at least one platinum group metal, vanadium oxide, titania and optionally tungsten oxide, the method comprises the steps of:

a) providing a monolithic substrate;

b) providing an aqueous solution of a vanadium compound;

c) providing an aqueous solution of one or more compounds of the at least one platinum group metal;

d) adding particles of titania to the aqueous solution of the vanadium compound to obtain a suspension comprising the titania particles suspended in the aqueous vanadium compound solution;

e) precipitating at least part of the vanadium compound in the suspension of step d) on surface of the titania particles to obtain a suspension of titania supported vanadium compound particles;

f) adjusting the pH value of the suspension to a value of at least 6 and adding the aqueous solution of the one or more compounds of the at least one platinum group metal to the pH adjusted suspension of the titania supported vanadium compound particles to obtain a wash coat slurry containing a suspended solid phase with the one or more compounds of the at least one platinum group metal adsorbed on the titania supported vanadium compound particles; or adding the aqueous solution of the one or more compounds of the at least one platinum group metal to suspension of the titania supported vanadium compound particles and subsequently adjusting the pH value of the suspension to a value of at least 6 to obtain a wash coat slurry containing a suspended solid phase with the one or more compounds of the at least one platinum group metal adsorbed on the titania supported vanadium compound particles;

g) coating the monolithic substrate with a layer of the wash coat slurry of step f);

h) decreasing the pH value of the layer coated on the monolithic substrate below 6 and dissolving the one or more compounds of the at least one platinum group metal from the titania supported vanadium compound particles on and into walls of the monolithic substrate; and i) drying and calcining the wash coated monolithic substrate.

The pH value of the suspension is one of the key parameters in the addition stage of solution of the palladium/platinum compounds and has to be carefully monitored to at least 6. The purpose of adjusting the pH value of the suspension is to prevent dissolution of the PGM compound(s) into the aqueous phase of the suspension in order to control a slower and even uptake of the compound(s) on the catalyst substrate.

Experiments have shown that pH values decreasing below 6 results in dissolution of increasing amounts of the PGM compound(s) into the aqueous phase of the suspension and the washcoat prepared from the suspension.

Based on these experiments, the suspension is preferably adjusted to pH 8, which also allows for a certain drop in pH value in the subsequent preparation steps.

It has additionally shown that particularly ammonium metavanadate (AMV) enhances the adsorption of Pd compounds on the titania-vanadium compound particles in the slurry. Addition of AMV ensures that Pd does not dissolve in the aqueous phase down to a pH of 6.

Thus, in a preferred embodiment of the invention, the vanadium compound used in the invention is ammonium metavanadate.

It is known that metallic or oxidic palladium is the most useful catalyst in the combined catalytic removal of carbon monoxide, VOC and nitrogen oxides.

Consequently, the at least one compound of the at least one platinum group metal is one or more compounds of palladium, which in the calcination step of the invention is converted to metallic and/or oxidic palladium.

The slurry prepared as described above is used for washcoating monolithic substrates. Due to the PGM compound(s) are retained in the solid phase of the washcoat, the PGM compound(s) will be evenly distributed on the whole exterior of the walls in the monolithic substrate. At that point the pH value of the wet wash coat present on the wall is lowered below 6 and the PGM compound(s) gets dissolved from the titania supported vanadium compound particles and starts to migrate into the walls and finally ends up evenly distribute into and on the walls.

It has further been observed that a monolithic substrate comprising vanadium oxide, titania and optionally tungsten before being washcoated with the washcoat prepared according to the invention, exhibits both Brønsted- and Lewis-acid sites, which decrease the pH value of the washcoat layer below 6 after the washcoat has been applied on surface of the monolithic substrate. At that point the acidity of vanadium oxide-titania contained in the monolithic substrate starts to decrease the pH value of the wet coat layer and the PGM compound(s) is dissolved from the titania supported vanadium compound particles in the washcoat layer and starts to migrate into the walls. Thereby, the PGM compound(s) are evenly distributed into the walls of the monolithic substrate.

Thus, in a specific embodiment of the invention the monolithic substrate as provided in step a) of the method according to the invention is provided with vanadium oxide, titania and optionally tungsten oxide within the walls prior to be coated with the washcoat. The vanadium oxide comprised in the monolithic substrate is preferably vanadium pentoxide having the highest activity in the SCR reaction.

A preferred PGM compound for use in the invention is palladium nitrate which is soluble in water and precipitates at a pH value of about 6 or higher, as desired in the invention.

The invention claimed is:

1. Method for the preparation of a monolithic catalyst for the reduction of nitrogen oxides VOC and carbon monoxide in an off-gas, the catalyst comprises at least one platinum group metal, vanadium oxide, titania and optionally tungsten oxide, the method comprises the steps of:
   a) providing a monolithic substrate;
   b) providing an aqueous solution of a vanadium compound;
   c) providing an aqueous solution of one or more compounds of the at least one platinum group metal;
   d) adding particles of titania to the aqueous solution of the vanadium compound to obtain a suspension comprising the titania particles suspended in the aqueous vanadium compound solution;
   e) precipitating at least part of the vanadium compound in the suspension of step d) on surface of the titania particles to obtain a suspension of titania supported vanadium compound particles;
   f) adjusting the pH value of the suspension to a value of at least 6 and adding the aqueous solution of the one or more compounds of the at least one platinum group metal to the pH adjusted suspension of the titania supported vanadium compound particles to obtain a wash coat slurry containing a suspended solid phase with the one or more compounds of the at least one platinum group metal adsorbed on the titania supported vanadium compound particles; or
   adding the aqueous solution of the one or more compounds of the at least one platinum group metal to suspension of the titania supported vanadium compound particles and subsequently adjusting the pH value of the suspension to a value of at least 6 to obtain a wash coat slurry containing a suspended solid phase with the one or more compounds of the at least one platinum group metal adsorbed on the titania supported vanadium compound particles;
   g) coating the monolithic substrate with a layer of the wash coat slurry of step f);
   h) decreasing the pH value of the layer coated on the monolithic substrate below 6 and dissolving the one or more compounds of the at least one platinum group metal from the titania supported vanadium compound particles on and into walls of the monolithic substrate; and
   i) drying and calcining the wash coated monolithic substrate.

2. The method according to claim 1, wherein the pH value in step f) is adjusted to at least 8.

3. The method according to claim 1, wherein the vanadium compound is ammonium metavan date.

4. The method according to claim 1, wherein the at least one compound of the platinum group metal is one or more compounds of palladium.

5. The method according to claim 1, wherein the pH value of the washcoat layer in step h) is decreased by providing vanadium oxide and titania in the monolithic substrate provided in step a).

6. The method according to claim 5, wherein the vanadium oxide is vanadium pentoxide.

7. The method according to claim 1, wherein the one or more compounds of the at least one platinum group metal is palladium nitrate.

* * * * *